(No Model.)

J. EROS.
FORK.

No. 536,862. Patented Apr. 2, 1895.

WITNESSES:

INVENTOR
J. Eros.
BY
Munn & Co
ATTORNEYS.

UNITED STATES PATENT OFFICE.

JOSEPH EROS, OF ANNISTON, ALABAMA.

FORK.

SPECIFICATION forming part of Letters Patent No. 536,862, dated April 2, 1895.

Application filed August 28, 1894. Serial No. 521,524. (No model.)

*To all whom it may concern:*

Be it known that I, JOSEPH EROS, of Anniston, in the county of Calhoun and State of Alabama, have invented a new and Improved Fork, of which the following is a full, clear, and exact description.

The invention relates to cutlery, and its object is to provide a new and improved table fork arranged to enable children and others to more readily take up the food from the plate and securely hold it on the fork while carrying it to the mouth.

The invention consists in the particular construction and arrangement of parts as hereinafter fully described and pointed out in the claims.

Reference is to be had to the accompanying drawings, forming a part of this specification, in which similar letters of reference indicate corresponding parts in all the figures.

Figure 1:
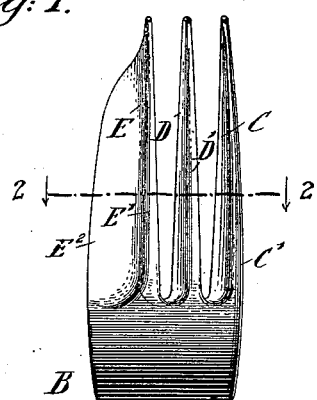
Figure 2:
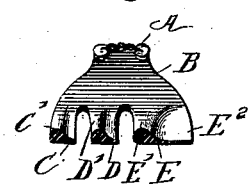
Figure 3:

Figure 1 is a plan view of the improvement. Fig. 2 is a transverse section of the same on the line 2—2 of Fig. 1; and Fig. 3 is a side elevation of part of the improvement.

The improved fork is provided with a handle A terminating in the base B of the fork proper, and from this base extend forward the curved tines C, D and E, each provided on one side, and on the top, with a ridge C', D' and E', respectively, as is plainly indicated in Fig. 2. One side tine E has its ridge E' on the inside, while the other side tine C has it on the outside, and in addition the tine E is widened, as at $E^2$, so as to form, with its ridge E', a scoop for readily taking up the food on the plate. This tine E, on account of being widened, takes the place of a fourth tine.

Now it will be seen that by forming the longitudinal ridges on the tines, the food placed on top thereof will readily lodge between the tines and thus be supported in a firm position, so as to enable children to readily carry the food to the mouth without danger of spilling. It will also be seen that as the widened portion of the tine E extends outward to form nearly a sharp edge, it permits the user to readily scoop up the food on the plate. It will thus be seen that the fork is very serviceable when eating fish and other like food that it is difficult to hold on a fork.

Having thus fully described my invention, I claim as new and desire to secure by Letters Patent—

1. As a new article of manufacture, a fork having each of its tines provided with a ridge on the upper surface and along one longitudinal edge thereof, the ridge of one tine being on the edge next to the thin portion of the adjacent tine, as set forth.

2. As a new article of manufacture, a fork having each of its tines provided with a ridge on its upper surface and along one longitudinal edge thereof, one outer tine having its ridge on the outside and the other outer tine being widened and having its ridge on the inside to form with the widened portion a scoop, as set forth.

3. As a new article of manufacture, a fork having each of its tines provided with a ridge on its upper surface and along one longitudinal edge thereof, one tine being widened, the thinner portions of the several tines being in a common plane to permit food to be readily scooped up, as specified.

JOSEPH EROS.

Witnesses:
R. D. CRUSOE,
W. H. COOPER.